J. S. WILSON AND W. E. DALBY.
METHOD AND APPARATUS FOR MEASURING ANGULAR VELOCITIES, &c.
APPLICATION FILED AUG. 7, 1917.
1,322,153.
Patented Nov. 18, 1919.
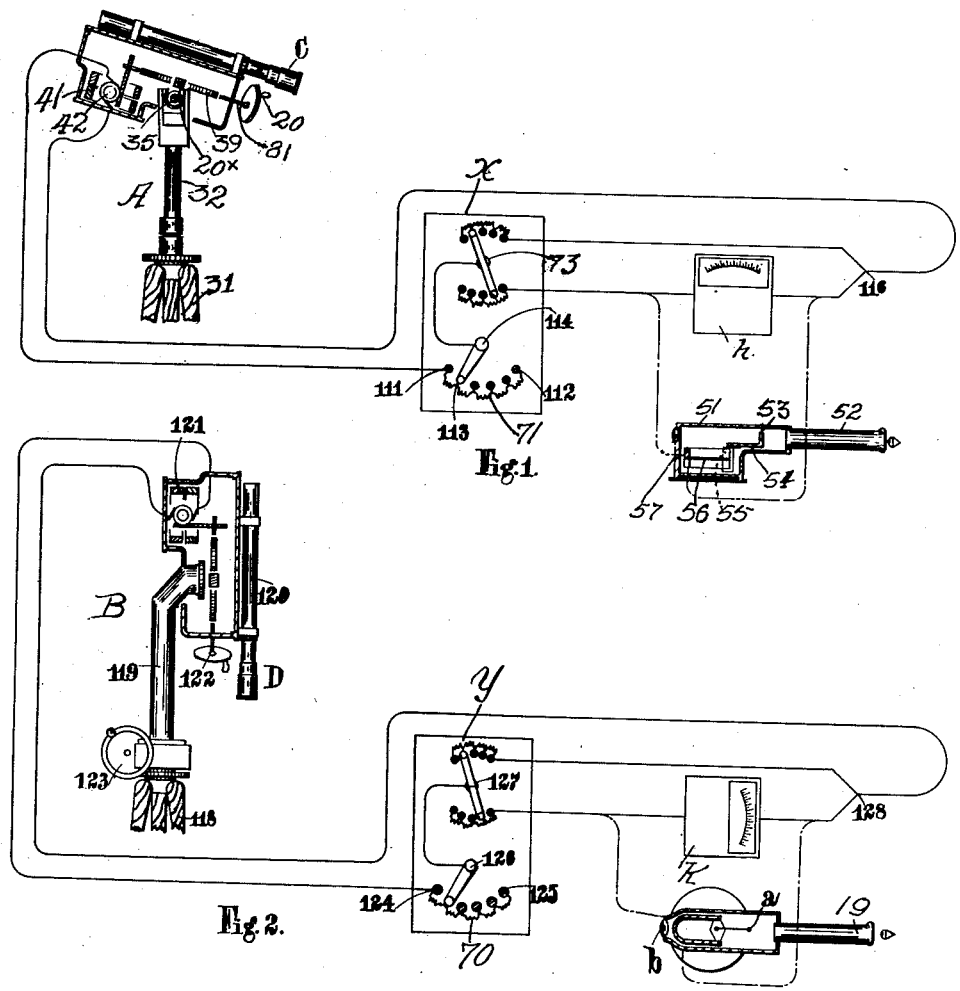

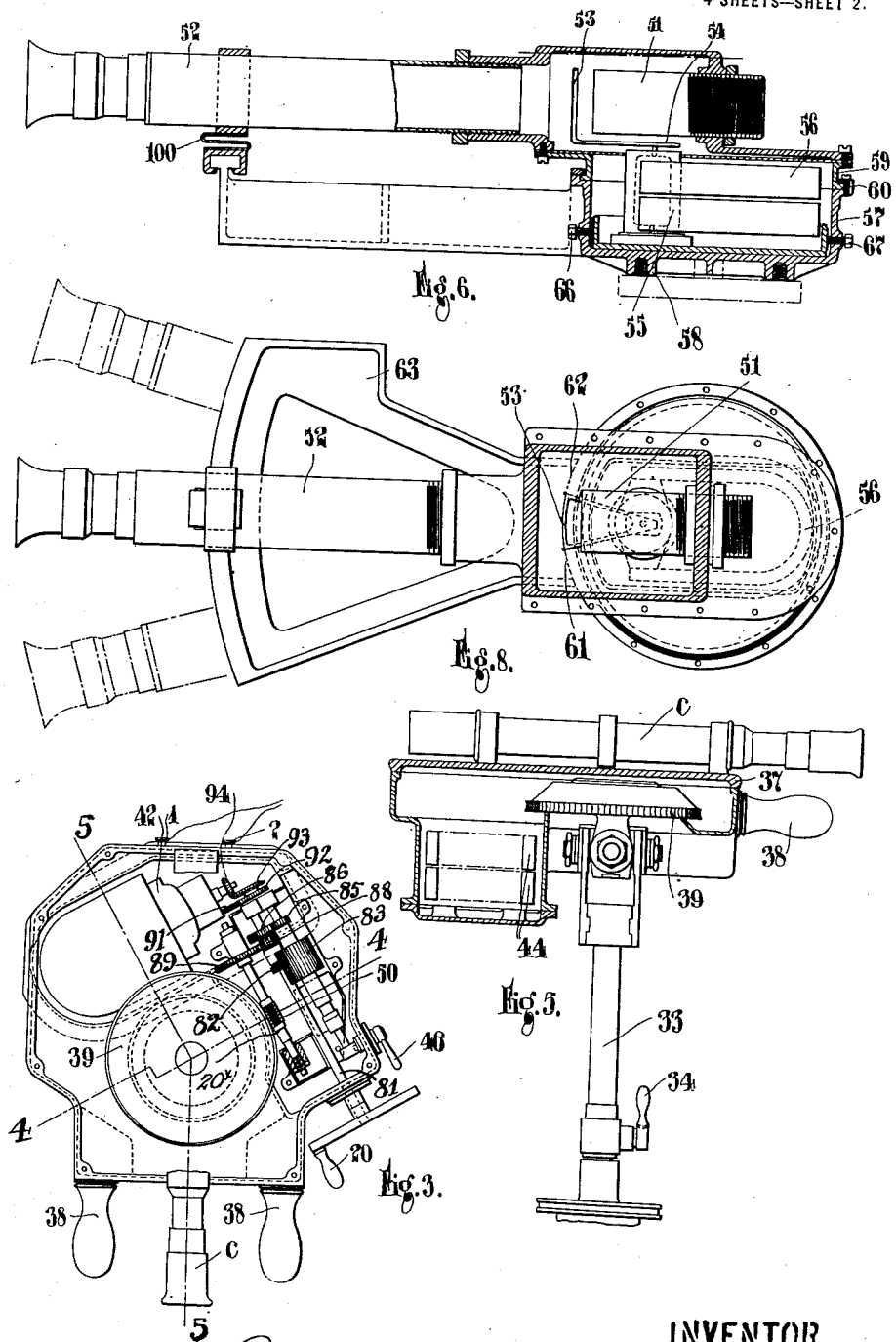

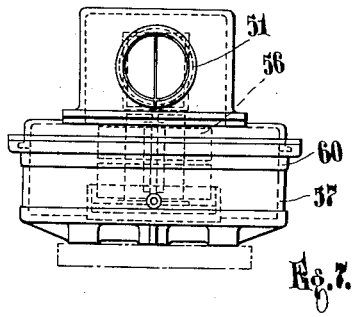
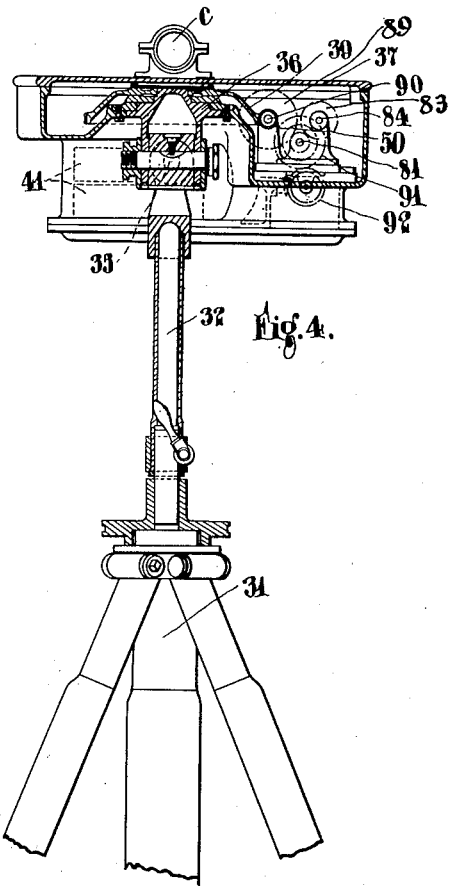

J. S. WILSON AND W. E. DALBY.
METHOD AND APPARATUS FOR MEASURING ANGULAR VELOCITIES, &c.
APPLICATION FILED AUG. 7, 1917.

1,322,153.

Patented Nov. 18, 1919.
4 SHEETS—SHEET 4.

UNITED STATES PATENT OFFICE.

JOHN SIGISMUND WILSON, OF WESTMINSTER, LONDON, AND WILLIAM ERNEST DALBY, OF EALING, LONDON, ENGLAND, ASSIGNORS OF ONE-THIRD TO SIR W. G. ARMSTRONG-WHITWORTH AND COMPANY LIMITED, OF NEWCASTLE-UPON-TYNE, ENGLAND.

METHOD AND APPARATUS FOR MEASURING ANGULAR VELOCITIES, &c.

1,322,153.   Specification of Letters Patent.   Patented Nov. 18, 1919.

Application filed August 7, 1917. Serial No. 184,980.

*To all whom it may concern:*

Be it known that I, JOHN SIGISMUND WILSON, a subject of the King of Great Britain and Ireland, and residing at 29 Denbigh street, Westminster, London, S. W. 1, and I, WILLIAM ERNEST DALBY, a subject of the King of Great Britain and Ireland, and residing at 37 Madeley Road, Ealing, London, W. 5, England, have invented a certain new and useful Method and Apparatus for Measuring Angular Velocities, Especially for Directing Artillery Fire, of which the following is a specification.

The present invention relates to an improved method and apparatus for directing fire against moving targets, particularly targets such as aircraft.

In Letters Patent of the United States granted to us January 1, 1918, No. 1252379, we have described a method and apparatus for measuring the angular velocity of the target either in the plane of sight or in the plane of altitude.

In such apparatus according to one example the observer moves a line of sight to follow the target either in the plane of sight or in the plane or altitude and the velocity of the following movement was recorded by an electromagnetic speed indicator on a dial placed in a suitable position on the instrument.

According to the present invention the rotary movement of a part of the mechanism by which the line of sight is moved to follow the target is transmitted to a speed indicator provided with suitable dials or pointers situated in any convenient position.

The invention consists in placing in the circuit of the armature of the electrical speed indicator a variable resistance which can be set according to the time of flight so that a single scale on a galvanometer on which the correction is read may be used for different ranges in any direction.

The invention also consists in actuating the gun sights themselves by means of the current produced by the motion of following the target with the sighting device.

The invention further consists in causing the current produced in the electrical speed indicator to actuate devices which form the back sight or fore sight of the guns, so that the correction for the relative movement of the target is made automatically on the sights.

The invention also consists in actuating an indicator for, or the sighting device of, a number of guns from the same pair of directors.

The invention also consists in the improved fire control devices hereinafter described.

Referring to the accompanying drawings:—

Figure 1 is a view in the nature of a diagram of one part of the complete apparatus which apparatus includes the parts shown in diagram in Fig. 2.

Fig. 2 is a view in the nature of a diagram of the second part of the apparatus of which Fig. 1 represents the other part.

Fig. 3 is a plan of the director of the instrument which is adapted to follow the target in the plane of altitude.

Fig. 4 is a sectional elevation on the line 4—4, Fig. 3.

Fig. 5 is a sectional elevation on the line 5—5, Fig. 3.

Fig. 6 is a sectional elevation of the sighting telescope of the gun.

Fig. 7 is an end elevation of the same, while

Fig. 8 is a plan of the sighting telescope with part of the cover removed.

Figure 9:
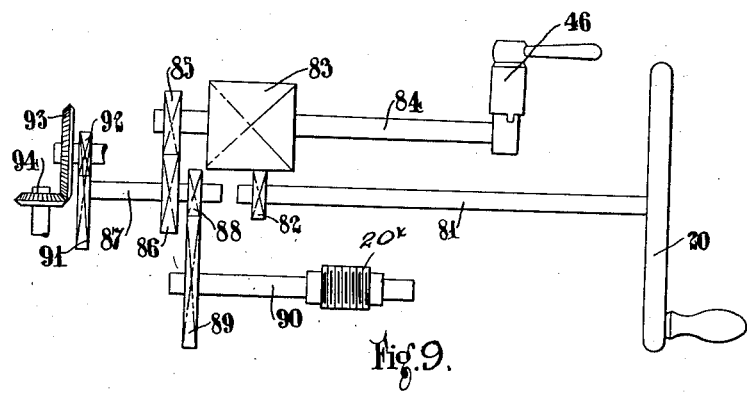
Figs. 9 and 10 are enlarged views of the gearing shown in Fig. 3.

It will be understood at the outset that the two resistance boxes or rheostats illustrated generally at X and Y in Figs. 1 and 2 respectively, are intended to be arranged in the same casing and instruments A and B with the associated parts and connections are parts of the same apparatus and are intended for conjoint use.

In carrying the invention into effect as shown diagrammatically in Figs. 1 and 2, we provide two instruments A and B, one having a line of sight (in the case illustrated a telescope C) with cross wires adapted to follow the target in the plane of altitude, the other B having a line of sight (as illustrated a telescope D) adapted to follow the target in the plane of sight, both these instruments as regards movement of the line of sight being constructed substantially as described in specification of Letters Patent of the U. S. A. granted to us on 1st January 1918 No. 1252379.

In this description the line of sight is the imaginary line passing through the sights and the target aimed at.

The angle of sight is the inclination of the line of sight to the horizontal plane.

The plane of sight is the vertical plane containing the line of sight.

The altitude plane is the plane sloping up from the observer to the target. It contains the line of sight and is inclined to the horizontal at the angle of sight.

The intersection of the plane of altitude and the plane of sight is in fact the line of sight.

The instrument A fully described below with reference to Figs. 3, 4 and 5, consists essentially of a fixed vertical axis 32 mounted on a portable tripod frame 31; on the top of the vertical axis is a universal joint 35—36 which allows the instrument to be set rapidly into the plane of altitude. Fixed to the inclined axis (which when the instrument is in action is substantially at right angles to the plane of altitude) is a worm wheel 39; the casing 37 of the instrument and all that it carries, including the telescopic sight C, and electric generator 41 can be turned about the inclined axis slowly by the hand-turning of the wheel 20 keyed to the shaft 81 which is held in bearings in the casing and is geared to the worm wheel 39 by the worm $20^x$.

The shaft 81 is geared also with the armature 42 of the electric generator 41 the terminals of which are in connection with a circuit leading through resistances and to the dial at the gun immediately to be described.

By these mechanical connections within the instrument it will be seen that when the wheel 20 is turned the effect is to give a slow angular motion to the casing and therefore to the telescopic sight mounted on top of it and simultaneously a proportionate quick rotation to the armature of the electric generator so that the voltage at the terminals of the generator is proportional to slow angular speed of the telescopic sight about the inclined axis.

The observer operates the instrument in this way. He grasps the handles 38, Figs. 3 and 5, provided on the casing and turns and tilts the casing about the universal joint 35 until axis of motion is inclined substantially at right angles to the altitude plane and the target is brought into the field of view. This operation is done in a few seconds. He then turns the wheel 20 at just the speed necessary to keep the target on the vertical cross-wire of the telescope. The result is that an electromotive force is produced at the terminals which is always proportional to the angular velocity of the line of sight as it follows the target.

The current passes from the generator, along the connecting wire shown, to the first contact 111 of a resistance 71 of which the last contact is 112. There are many intermediate contacts (4 only shown in the diagram) all connected in series with the first and last contact.

The arm 113 can be turned about the center pivot 114 and the contact to which it is turned determines the amount of resistance put into the circuit. The current enters the resistance always at the first contact 111, and after passing through the resistance in circuit leaves the rheostat by the arm and flows to the center point 114 (or an equivalent contact ring) from which it passes to the center point of a second rheostat 73. Here it divides into two parallel circuits, which reunite at the common point 116 and this point is connected to the negative terminal of the electric generator in the instrument A.

The voltmeter dial $h$ is placed in one loop of the parallel circuit. The resistance provided in the rheostat at 73 is designed so that any desired fraction of the total current arriving at 73 can be sent through the voltmeter $h$ while the total resistance between the points 73 and 116 remains unchanged. The turning of the contact arm about the pivot of rheostat 73 increases or reduces the resistance of the loop in which the voltmeter $h$ is placed, and simultaneously reduces or increases the resistance in the other loop so that the total resistance from 73 to 116 is unaltered. The resistance in the rheostat 114 is designed so that the current is varied proportionally to the time of flight.

The current is proportional to the angular velocity of the line of sight laterally so long as the wheel 20 is turned by the observer operating the instrument A to keep the target on the sights.

The current is proportional to the time of flight from the gun to the target when the arm pivoted at 114 is turned to the correct angular position corresponding to the time of flight. This is set by a man in charge of the rheostat to the time of flight separately communicated to him from observations separately made of the height or range of the target. When the arm is correctly set (that is when the correct resistance is selected, hence the name selector) the current is proportional jointly to the angular velocity of the line of sight and to the time of flight. But this product is proportional to the lateral deflection required at the gun. Therefore the current in the circuit is proportional to the lateral deflection. Therefore any fixed fraction of it is proportional to the angle of lateral deflection. Therefore, the part flowing in the loop of the parallel circuit above described is proportional to the lateral deflection.

The scale of the voltmeter dial placed in this loop is so graduated that the angular displacement of the needle which is proportional to the current is interpreted in actual degrees of deflection. This voltmeter dial is placed close to the gun so that the gun layer sees the angle of lateral deflection which he must put on to allow for the movement of the target correctly shown so long as the observer at the instrument turns the handle 20 to keep the target on the vertical cross wire of the telescope, and the man controlling the resistance keeps the rheostat arm set to the resistance corresponding to the correct time of flight.

The instrument A can be set up in any convenient position.

Turning now to instrument B it is set up near instrument A on a portable tripod stand 118. The vertical axis 119 carries at the top a horizontal axis about which the casing and all that it carries, including the telescopic sight 120 and the electric generator 121, is turned by turning the handwheel 122. The inside connections are similar to those of instrument A and need not be further described here beyond stating that the turning of the wheel 122 gives a slow motion about the horizontal axis to the telescope 120 and a proportionate quick rotation to the armature of the electric generator 121 the result of which is to produce an electromotive force at its terminals proportionate to the slow angular motion of the telescope about the horizontal axis, that is proportionate to the slow angular motion of the line of sight in the vertical plane of sight. A wheel 123 is provided for giving motion of the whole instrument about the vertical axis. The observer therefore operates the instrument in this way. He grasps suitable handles provided on the casing and turns the instrument up toward the target at the same time turning the wheel 123 to assist in training. The target is caught in the field of view in a few seconds. He then turns the handle wheel 122 at the speed necessary to keep the target on the horizontal cross wire of the telescope. The result is that an electromotive force is produced at the terminals of the electric generator in the casing proportional to the angular velocity of the line of sight in the vertical plane.

The current passes from the generator to the first contact 124 of a resistance 70 of which 125 is the last contact, the many intermediate resistances being connected in series with the first and the last contact. These resistances are duplicates of those already described in circuit with A. The arm 126 is set so that the current is jointly proportional to the time of flight and to the angular velocity of the line of sight in the vertical plane, that is the current is proportional to the vertical deflection which must be given to the gun to allow for the speed of the target vertically.

The current leaves the rheostat and flows to the center of a second rheostat 127 where it divides into two parallel circuits in one loop of which is placed the voltmeter dial $k$ the scale of which is adapted to reduce the actual angular deflection of the needle to angles of vertical deflection. This dial is placed near the gunlayer so that the vertical deflection which must be put on to allow for the motion of the target is always visible to him.

The two circuits, connected respectively with instruments A and B, are similar in their mechanical arrangements. They differ only in the respect that in one of them a current is flowing proportionate to the lateral deflection and in the other a current is flowing proportionate to the vertical deflection.

In another way of using the apparatus the dials $h$ and $k$ are disconnected and connection is made directly to voltmeter movements carried respectively in the training and elevating sights of the gun. The end of the needles of the voltmeter movements are formed into sighting elements. In the lateral sight for example the end of the voltmeter needle carries a fine vertical wire 53, and this vertical wire forms the back sight of the telescope the fore sight of which is the optical center of the front object glass combination. The gunlayer then merely trains to keep the target on the vertical wire 53. He is unconscious of the small lateral movement continually going on to allow for the lateral speed of the target except if the movement is so pronounced that the wire moves toward the edge of the field of view. He can then give a slight angular motion of the telescope to bring the vertical wire within the central part of the field of view again. These controlled sights are described fully below, see Figs. 6, 7 and 8.

In order to observe over as wide a range of speed as possible the driving handle 20 is connected with the central worm wheel 39 and the generator by two trains of wheels, one to be used when the target is moving slowly and the other to be alternatively used when the target is moving rapidly. The hand wheel is thrown in connection with one or other of these trains by turning the catch 46, Figs. 9 and 10.

Figure 10:
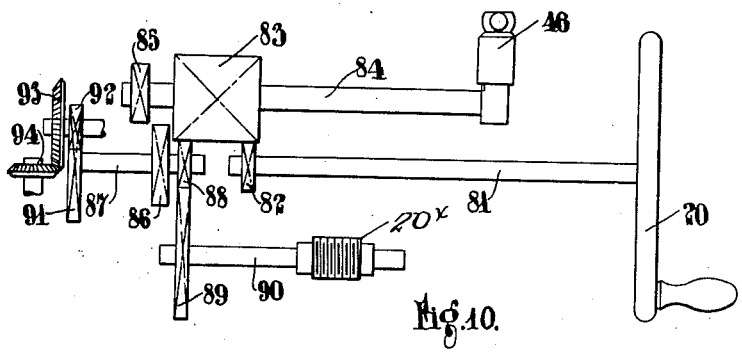

The gearing is shown enlarged in two positions in Figs. 9 and 10. The handle 20 drives a shaft 81 which carries a pinion 82 which is always in gear with the long gear wheel 83 on the axially movable shaft 84. The shaft 84 also carries a gear wheel 85 which in the position shown in Fig. 9 engages with a gear wheel 86 on an intermediate shaft 87 which carries a pinion 88 always in engagement with a gear wheel 89 on the worm shaft 90. When the shaft 84 is shifted axially by the handle 46 to the position shown in Fig. 10 the gear wheel 85 is moved out of engagement with the gear wheel 86 and the long gear wheel 83 engages with the pinion 88 and so drives the pinion 89 and the worm shaft 90 in the same direction as before but at an increased speed. The armature of the dynamo is driven by a gear wheel 91 engaging a gear wheel 92 on an intermediate shaft carrying the bevel wheel 93 driving the bevel wheel 94.

The director may be constructed to carry a dial on which the deflection is indicated in the way already described in U. S. patent above mentioned in addition to the generator which has just been described. The addition of a few wheels and a shaft to drive the speed indicating dial is all that is necessary to add to the apparatus just described.

In the modification shown in Figs. 1, 6, 7 and 8, in which the lines of sight of the gun are directly adjusted by the electric current, the foresight of the gun is the optical center of the combination of lenses carried in the tube 51 forming the object glass of the telescope 52. The back sight is the wire 53 carried on the pointer 54 which is suitably formed for the purpose on the galvanometer having a movable armature 55 and magnets 56. The pointer of the galvanometer is thus adapted to act as the back sight of the gun.

The galvanometer is carried in an iron box 57 which is fixed to the gun cradle or gun carriage by bolts inserted at 58, 58. The dotted line indicates a support rigidly connected with the gun cradle or carriage. A cover 59 is jointed with the box 57 by the ring joints 60 so that it can move relatively to the box 57 through any desired angle about the axis passing through the optical centre of the object glass combination 51. The telescope formed by the object glass element 51 and the eye-piece element 52 is secured to this cover 59.

The elements of the telescope are so secured to the cover 59 that the object glass combination 51 can be adjusted to bring its optical center accurately on the axis of relative rotation of the parts 57 and 59 and also so that the eye-piece combination 52 can be adjusted to focus on the image formed by the object glass combination on its focal plane. The back sight wire 53 is adjusted to move approximately in the focal plane of the object glass combination 51 by means of the set screws 66 and 67 which are arranged to move the whole galvanometer slightly in the necessary direction for this purpose.

The limits of movement of the back sight wire are marked by the points 61 and 62 on the plan view. These limits can be fixed to any desired amount.

By the arrangement above described the telescope can be turned about the axis of relative rotation of the parts 57 and 59 so that right up to the extreme limits of deflection of the back sight marked by the points 61 and 62 the back sight wire may be viewed in the center of the field.

A casting 63 is attached rigidly to the box 57 a face 64 being formed on it to correspond with a fixed part of the gun cradle or carriage so that it can be connected thereto to form an additional support of the apparatus. This casting is formed with a segmental rim struck from a center on the axis of relative motion of the box 57 and its cover 59, so that it may act as a support for the eye-piece end of the telescope. The telescope may be pushed along this segmental arc when following the movement of the back sight in the field of view by hand or it may be actuated by gearing. The drawing shows it merely supported and held in position by a spring 100. This spring provides frictional resistance in addition to the frictional resistance of the ring joint 60. When the telescope is moved by steps notches are cut in this segment at the correct angular distances apart to correspond with the assigned steps through which the telescope is to be moved, a detent on the telescope engaging with these notches and acting to hold the telescope in the position defined by a notch.

The telescopic sight for lateral deflection illustrated in Figs. 6, 7 and 8 is adapted to give a wide field of view, the field of view indicated in the drawing being 15° on each side of the mid position; this enables a rapidly moving target to be kept on the sights over a wide range and is of great importance in anti-aircraft gunnery.

The vertical component of the motion of aircraft is not so rapid and it may be unnecessary to always allow a range as wide as 30° on the sights for adjusting the tangent elevation of the gun. In this case the telescope is merely clamped at the central position and the fan-shaped piece 63 is adapted to act as a connector to the gun cradle. The sight may be used in the vertical plane substantially as described above when it is required to follow the moving target over a considerable vertical range.

The operation of the above described apparatus where the sights are automatically set by the electric current is as follows:— The guns are designed and mounted so that two gun layers are required to lay the gun on a moving target. The gun layer trains the gun laterally keeping the target on the vertical cross wire forming the back sight of the telescopic sight; the second gun layer elevates the gun keeping the target on a horizontal cross wire, forming the back sight of the second telescopic sight.

An observer at each of the directors keeps the target on the cross wire of the telescope and an observer at the rheostat having determined the range by any suitable method sets the resistances in the rheostat box X, Y, Figs. 1 and 2, according to the time of flight required for the range determined. The current from the dynamo of the director A then causes the back sight of the telescope 51—52 to move to give the correct sighting for lateral movement of the moving target. The gun layer has only to keep the target on the sight of the gun to give the correct lateral deflection. Similarly the gun layer observing the target through the sighting telescope 119, Fig. 2, gives the right correction for vertical deflection. We thus obtain automatically the corrections necessary to enable the projectile to hit the moving target.

It will be readily seen that the same pair of directors may be employed to actuate the sights of more than one gun or to actuate more than one pair of dials so that a number of guns in different positions can be controlled by a single pair of directors. This can be effected simply by connecting the galvanometers controlling the sights of the different guns for vertical deflection in the same electric circuit arranging compensating resistances so that if the galvanometer of one particular gun is not in use, an equivalent resistance is inserted in the common circuit. Similar connections would be made for the control of the sights for lateral deflection.

Where in the appended claims we refer to a pointer or indicating member these terms are used in a generic sense to mean either a sighting point as 53, which is adjusted by the current from the generator or a pointer of an indicating dial.

Having now described our invention, what we claim as new and desire to secure by Letters Patent is:—

1. An apparatus for measuring angular velocities especially for directing artillery fire, which consists of a sighting device movably mounted to follow the target, an electric generator connected to the sighting device and generating a current as a consequence of and proportional to the velocity of the following movement of said sighting device, a pointer or the like and means for moving said pointer by the generated current, and a variable resistance in the circuit between the electric current generator and said pointer adapted to be set according to the time of flight of the projectile.

2. An apparatus for measuring angular velocities of a target for directing artillery fire consisting of a director having a movable sighting device to follow the target in the plane of altitude and a second director having a sighting device to follow the target in the plane of sight, an electric generator for each director with means for rotating the same in accordance with the speed of movement of the sighting device belonging to the director with which said generator is associated, indicating members, electromagnetic means for moving the same by the current generated, said electromagnetic means adjusting the indicating members according to the current generated, and variable resistance means between the electric current generators and the said electromagnetic means adapted to be set according to the time of flight of the projectile, substantially as described.

3. An apparatus for measuring angular velocities of a target for directing artillery fire consisting of a director having a movable sighting device to follow the target in the plane of altitude and a second director having a sighting device to follow the target in the plane of sight, an electric generator for each director with means for rotating the same in accordance with the speed of movement of the sighting device belonging to the director with which said generator is associated, a sight at the gun for training the gun laterally, a sight at the gun for training the same vertically, each of said sights having a movable member, electromagnetic means at each gun sight for operating the movable member thereof, and connections for supplying current from the generators to the electromagnetic means of the movable sighting members individual to the respective generators, substantially as described.

4. An apparatus for measuring angular velocities of a target for directing artillery fire consisting of a director having a movable sighting device to follow the target in the plane of altitude and a second director having a sighting device to follow the target in the plane of sight, an electric generator for each director with means for rotating the same in accordance with the speed of movement of the sighting device belonging to the director with which said generator is associated, a sight at the gun for training the gun laterally, a sight at the gun for training the same vertically, each of said sights having a movable member, electromagnetic means at each gun sight for operating the movable member thereof, and connections for supplying current from the generators to the electromagnetic means of the movable sighting members individual to the respective generators, and variable resistance means in the circuit between the generators and the said electromagnetic means adapted to be set in accordance with the time of flight, of the projectile.

In testimony whereof we have affixed our signatures.

JOHN SIGISMUND WILSON.
WILLIAM ERNEST DALBY.